United States Patent

Swinbanks et al.

[11] Patent Number: 6,116,179
[45] Date of Patent: Sep. 12, 2000

[54] MOUNTING OF MACHINERY WITHIN A VESSEL

[75] Inventors: Malcolm A Swinbanks, Cambridge; Frederick A Johnson, Sevenoaks, both of United Kingdom

[73] Assignee: Bae Systems Electronics Limited, United Kingdom

[21] Appl. No.: 08/804,350

[22] Filed: Mar. 6, 1997

[30] Foreign Application Priority Data

Mar. 8, 1996 [GB] United Kingdom ............... 9604973

[51] Int. Cl.[7] .................. F16F 15/03; B63H 21/30; F16M 7/00
[52] U.S. Cl. ............... 114/269; 248/636; 248/638; 310/51; 104/293; 440/111
[58] Field of Search .................. 104/290, 293; 188/267, 378, 380; 248/550, 562, 636, 638; 310/51, 90.5; 318/114, 115, 128, 135; 440/111, 113; 114/269, 271

[56] References Cited

U.S. PATENT DOCUMENTS 5,387,851  2/1995  Nuscheler et al. .................. 318/135

FOREIGN PATENT DOCUMENTS 2221743  2/1990  United Kingdom .................. 248/638

Primary Examiner—Charles T. Jordan
Assistant Examiner—Denise J Buckley
Attorney, Agent, or Firm—Kirschstein, et al.

[57] ABSTRACT

A vessel comprises a cylindrical hull (10) containing a structure (11) carrying machinery (M) supported from the hull (10) by electromagnetic levitation means (12–17) that maintain electromagnetic forces between flux gaps (24) which are arranged to extend radially of the adjacent hull (10) curvature and longitudinally of the hull (10). In this manner, the transmission of noise from the machinery (M) to the hull (10) is obviated so as to reduce the detectable acoustic signal emitted by the vessel and furthermore, radial expansion or contraction of the hull (10) is prevented from mechanical transmission to the structure (11) via the levitation means (12–17).

20 Claims, 8 Drawing Sheets

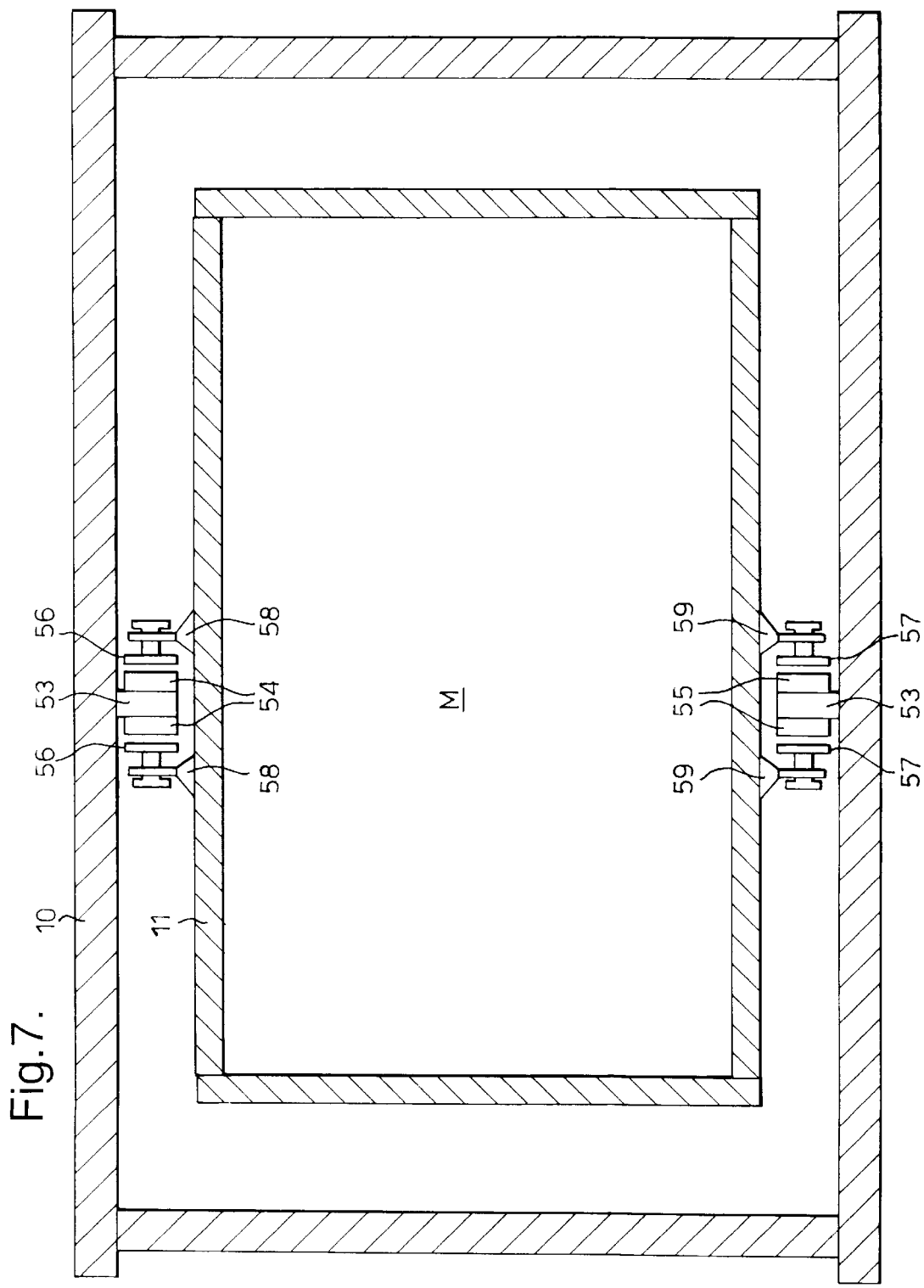

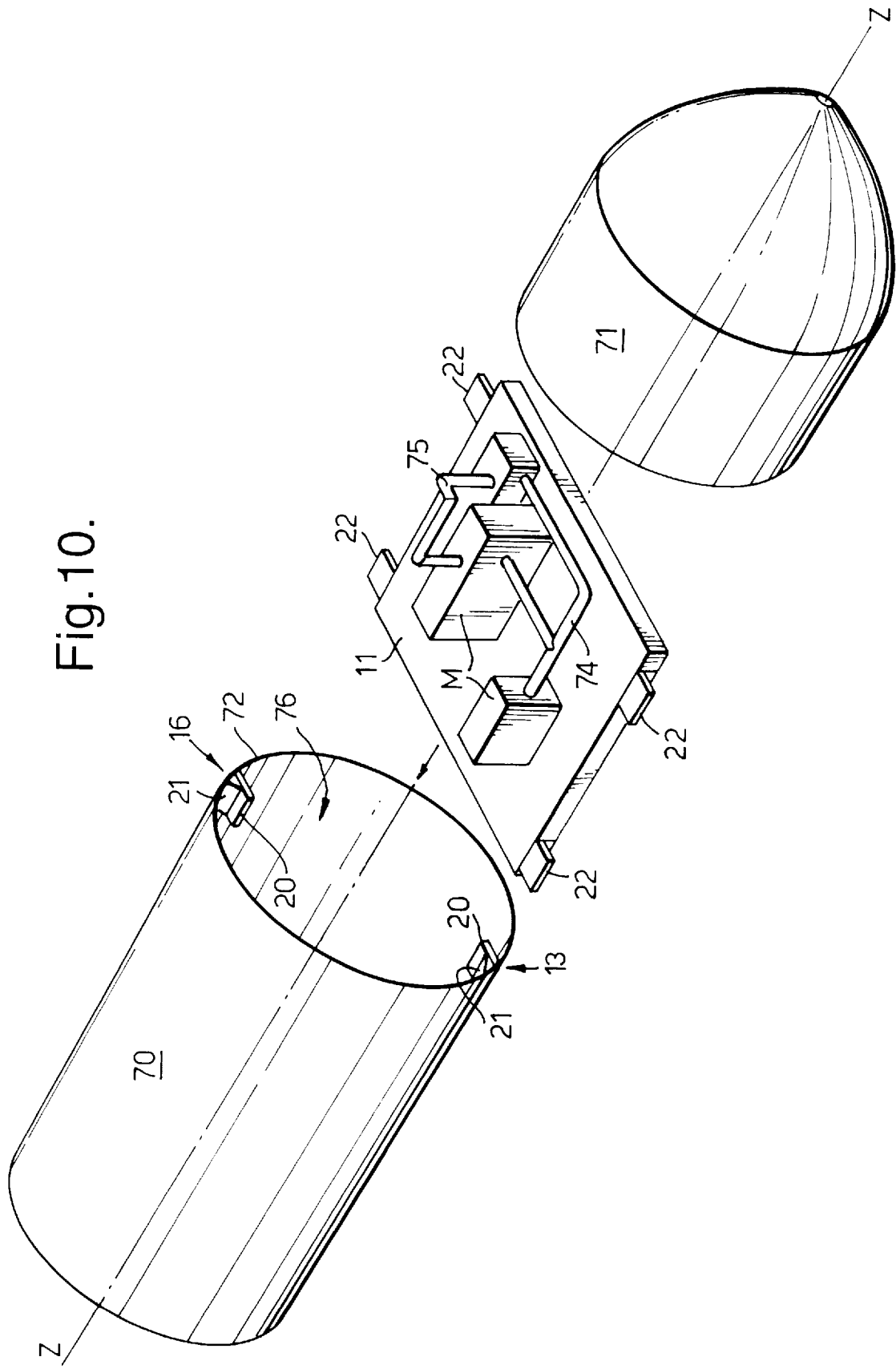

MOUNTING OF MACHINERY WITHIN A VESSEL

BACKGROUND OF THE INVENTION

This invention relates to the mounting of machinery within the hull of a vessel which can be a surface vessel or a submersible vessel such as a submarine.

Our UK Patent 2221743 teaches that machinery may be supported, either directly or via a raft, from an array of supports which are adjustable and are controlled by a control means, in dependence upon flexing or resonance of the raft or upon flexing of the machinery, such as to suppress that flexing. This patent also teaches that the machinery is mounted in a surface marine vessel and that the supports can be hydraulic or other mechanisms, although electromagnets are preferred. The currents through the various electromagnets are controlled by an electronic control system in such a way as to ensure that the raft does not flex or vibrate and that the integral force transmitted to the hull of the vessel has a substantially zero component for vibrations associated with any flexing and resonance of the machinery itself. Although specifically describing the use of electromagnets to repel permanent magnets, this patent also envisages that pairs of electromagnets may be used to attract metallic members connected to either the raft or the hull in order to keep the raft levitated.

SUMMARY OF THE INVENTION

The present invention is concerned with the electromagnetic levitation of machinery within the hull of a vessel in a manner which can inhibit the transmission of noise from the machinery to the hull, can inhibit the transmission of shock from the hull to the machinery, and can accommodate expansion and contraction of the hull by external hydraulic forces. The invention is also concerned with an improved method of manufacturing a submarine.

According to one aspect of the invention a vessel comprises a hull containing a structure carrying machinery, and an electromagnetic levitation means which is arranged to support the structure from the hull by electromagnetic forces between flux gaps that extend generally normal to a direction of potential hull distortion. In this manner radial expansion or contraction of the hull cannot be mechanically transmitted by the levitation means to the structure. Such expansion and contraction is caused by variation of the ambient water and air temperatures and, in the case of submarines, by the very significant changes in external water pressure. Furthermore, the electromagnetic levitation inhibits transmission of noise from the machinery to the hull thereby enabling the vessel to operate without producing a detectable acoustic signal. The electromagnetic levitation also operates to inhibit the transmission of shock from the hull to the machinery, thereby reducing the extent of potential damage caused by heavy weather, or by depth charges and similar ordinance. When the hull is curved, the flux gaps preferably extend generally radially of the adjacent hull curvature. When the hull is submersible and is generally cylindrical, the flux gaps preferably extend longitudinally of the hull and generally radially of the adjacent hull curvature.

The electromagnetic levitation means preferably comprises a set of electromagnets separated by the flux gaps from a corresponding set of armatures, one set being secured to the hull and the other set being secured to the structure, and each electromagnet and associated armature are arranged to define a levitation device.

The levitation devices are preferably split into two arrays disposed in a transverse plane normal to the longitudinal hull axis, one array being arranged to generate clockwise resultant forces about the longitudinal hull axis and the other array being arranged to generate anticlockwise resultant forces about the longitudinal hull axis. The levitation devices preferably are additionally split into a plurality of groups spaced longitudinally of the hull and each comprising a pair of the arrays.

Each levitation device may be arranged such that its armature will be attracted by its electromagnet, and a control device be provided to regulate the current to the electromagnet of each levitation device such that the resultant of the forces generated by the levitation devices will balance the force necessary to maintain the structure and its associated machinery substantially in a predetermined position within the hull. In this case the control device is preferably arranged to regulate the current to the levitation devices such that the resultant forces will also balance the forces necessary to maintain the structure and its associated machinery substantially in a predetermined orientation relative to the hull. The control device is preferably arranged to provide differential regulation of the levitation devices to produce a torque to counteract the inertia of the structure and its machinery during rolling motion of the hull. A detection means may be arranged to operate the control device dependant on the direction and rate of the hull roll. The control device may be arranged to provide differential regulation of the levitation devices to produce a couple to counteract the inertia of the structure and its machinery during hull motion. In the case where the machinery is arranged to drive a mechanical propulsion means for the vessel, the control device is preferably arranged to provide differential regulation of the levitation devices to produce a torque to balance the torque reaction of the mechanical propulsion means on the support. Each levitation device preferably incorporates a decoupling device to permit movement of the structure beyond the position defined by the closing of its flux gap.

A shock absorber is preferably arranged to engage and support the structure directly from the hull whenever the resultant forces generated by the levitation devices are unable to maintain the structure and its associated machinery in its predetermined position and/or orientation.

The structure is preferably supported in a predetermined axial position within the hull by an electromagnetic device, and a controller is provided to regulate the current to the electromagnetic device to generate a resultant axial force equal to the force necessary to maintain the structure and its associated machinery substantially in the predetermined axial position.

According to another aspect of the invention a method of manufacturing a submarine comprises building the hull in at least two portions which are shaped and dimensioned to be joined end-to-end along respective surfaces arranged generally transverse to the longitudinal axis of the hull, mounting machinery on a structure positioned outside the hull portions inserting the structure with its mounted machinery longitudinally into an open end of one hull portion, and arranging an electromagnetic levitation means between the one hull portion and the structure with associated flux gaps extending longitudinally of the hull and generally radially of the adjacent curvature of the one hull portion, and joining the hull portions end-to-end after the insertion of the structure into the one hull portion.

The method preferably includes mounting one portion of the electromagnetic levitation means on the structure whilst it is positioned outside the hull portions. It may also include mounting the remainder of the electromagnetic levitation means within the one hull portion before the insertion of the structure.

The method preferably includes constructing the electromagnetic levitation means as a set of electromagnets separated by the flux gaps from a corresponding set of armatures whereby each electromagnetic and is associated curvature define a levitation device and building each levitation device with a decoupling device to permit relative movement between its electromagnet and its armature beyond the position defined by its flux gap, and using the decoupling devices to increase the clearances between the electromagnets and the armatures during insertion of the structure into the said one hull portion.

BRIEF DESCRIPTION OF THE DRAWINGS

The invention will now be described, by way of example only, with reference to the accompanying drawings, in which:

FIG. 7 is a diagrammatic longitudinal section through the submarine hull shown in FIGS. 3 or 6, but illustrating an electromagnetic device for maintaining the structure longitudinally of the hull;

FIG. 10 is an isometric view illustrating a method of manufacturing a submarine.

DETAILED DESCRIPTION OF THE PREFERRED EMBODIMENTS

Figure 1:
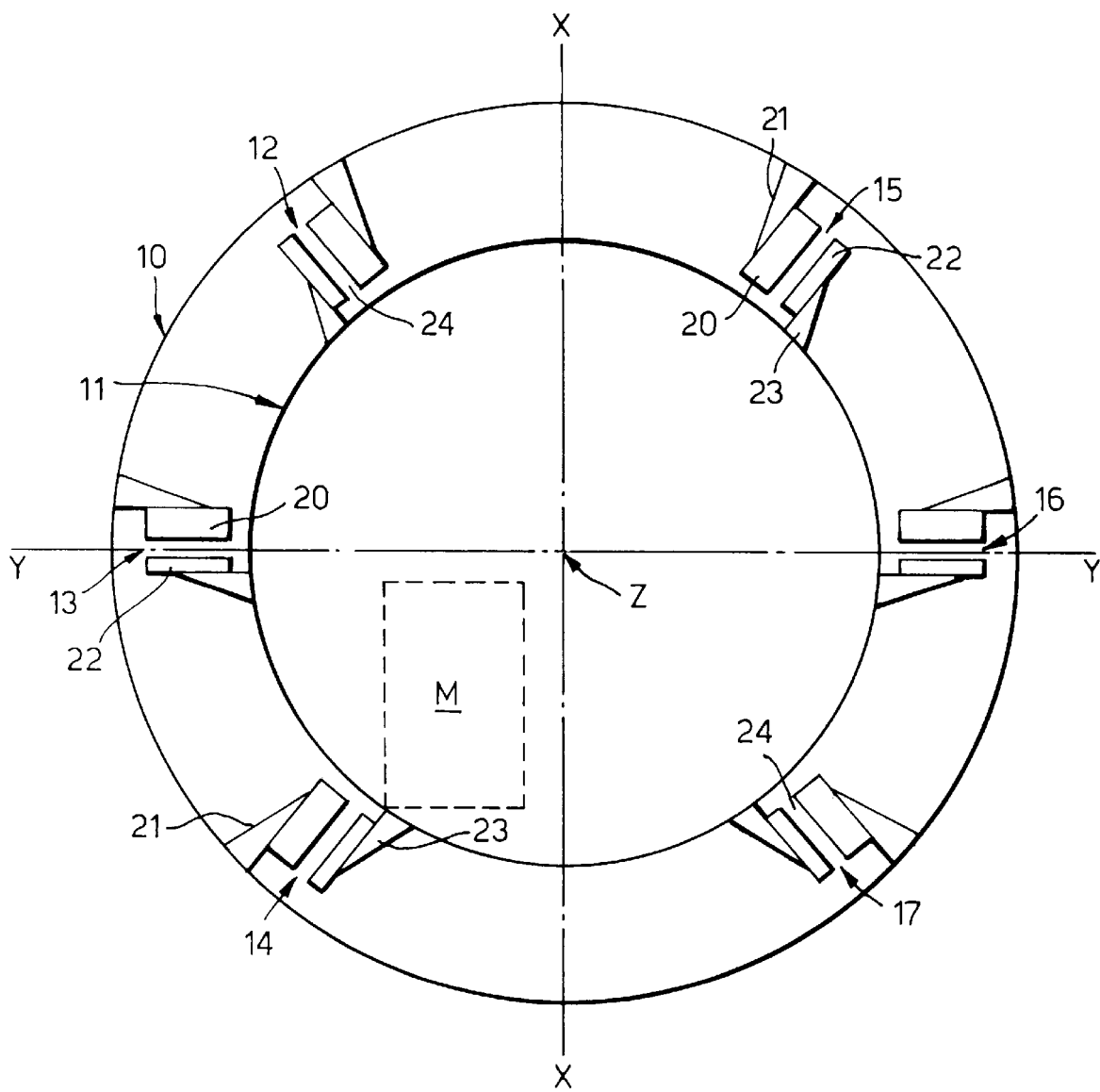
FIG. 1 is a diagrammatic transverse cross-section taken through the hull of a submarine, showing a preferred arrangement of electromagnetic levitation means comprising six electromagnetic levitation devices split into two arrays.

With reference to FIG. 1, a vessel, in the form of a submarine, comprises a generally cylindrical submersible hull 10 containing a structure 11 carrying machinery M associated with the operation of the submarine. Although the structure 11 is shown as being cylindrical, it can be of any shape appropriate for supporting the machinery.

The structure 11 and its associated machinery is supported within the hull 10 by an electromagnetic levitation means which comprises six levitation devices 12, 13, 14, 15, 16 and 17. Each of the levitation devices comprises an electromagnet 20 secured by a bracket 21 to the hull 10 and an associated armature 22 secured to the structure 11 by a bracket 23.

The electromagnets 20 are arranged to attract their respective armatures 22 by electromagnetic forces exerted between their flux gaps 24. These forces are preferably controlled by a control device which regulates the current to each electromagnet 20 in the manner taught in our co-pending British Patent Application No. 9604429.2 (GEC Case File P/60857/MRC) filed on Mar. 1, 1996, the whole contents of that application being incorporated herein by reference.

The vertical access of the submarine is indicated by the line XX, the horizontal axis by the line YY and the longitudinal axis as Z. It will be noted that the levitation devices 15 are split into two arrays, one array comprising the electromagnets 12, 13 and 14 which are arranged to generate clockwise resultant forces about the longitudinal hull axis Z, and the other array comprising the electromagnets 15, 16 and 17 being arranged to generate anti-clockwise resultant forces about the longitudinal hull axis Z.

Figure 2:
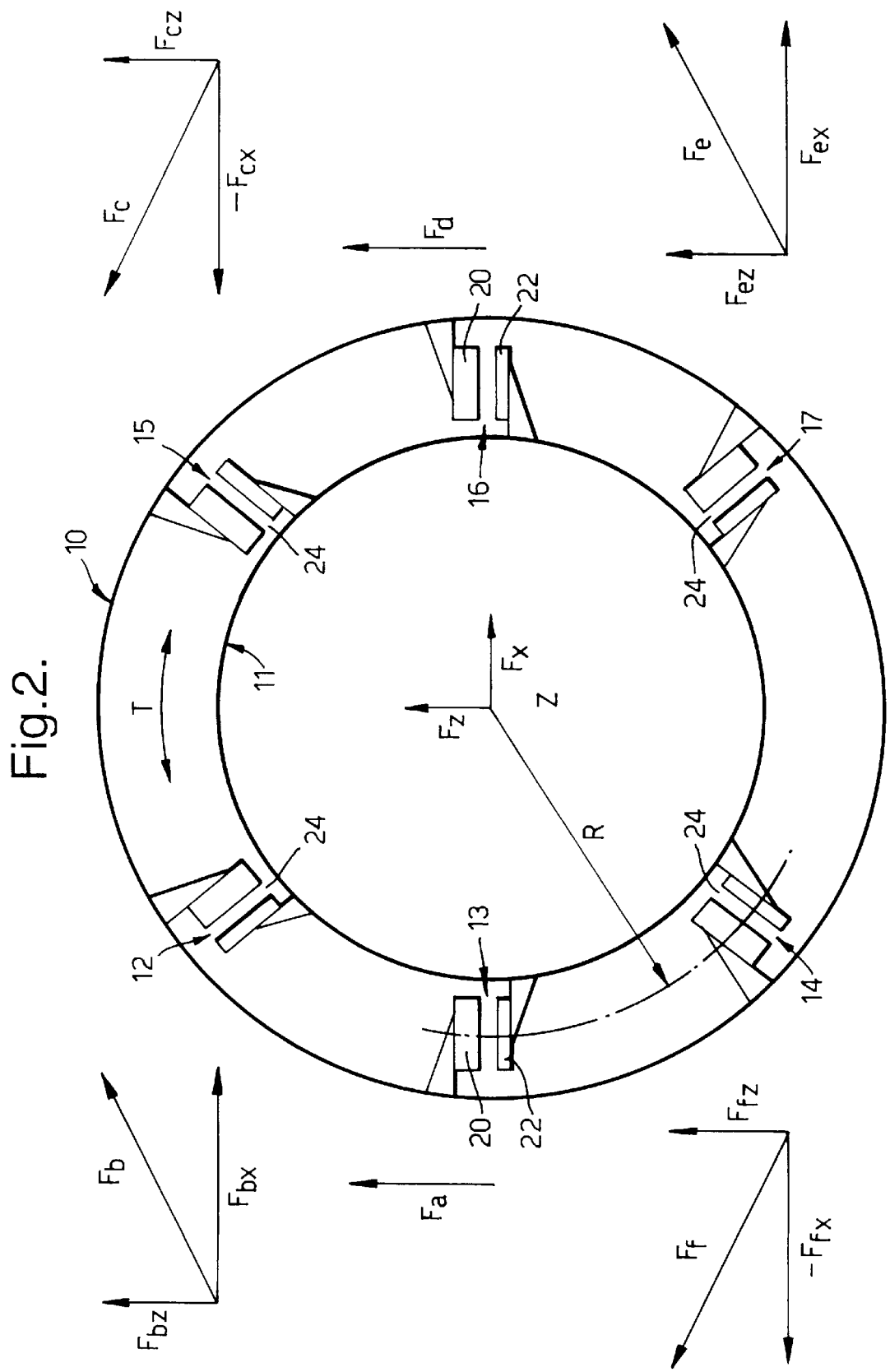
FIG. 2 is equivalent to FIG. 1 but illustrates the forces generated by six electromagnetic levitation devices together with the vertical and horizontal vectors.

FIG. 2 shows exactly the same disposition of electromagnets and armatures as has been described with reference to FIG. 1. However, it additionally illustrates the resultant electromagnetic forces exerted by each of the electromagnets 12, 13, 14, 15, 16, and 17. The flux gaps 24 are arranged radially of the adjacent curvature of the hull 10 so that the hull is completely free to move radially relative to the structure 11 without altering any of the flux gaps 24. This is of particular importance with a submarine as the diameter of the hull 10 can be substantially reduced by the compression forces of the surrounding water as the vessel dives. As the hull 10 is cylindrical, the direction of potential hull distortion is radial of the adjacent hull curvature. However, if the hull 10 were to be other than cylindrical, the flux gaps 24 would be arranged to extend generally radially of the curvature of the adjacent hull.

It will therefore be appreciated that the electromagnet 20 of each of the levitation devices 12, 13, 14, 15, 16 and 17 will exert a force F about the longitudinal hull access Z and with an effective radius R. The levitation devices are split into two arrays, one array 12, 13 and 14 being arranged to generate their resultant forces clockwise about the longitudinal hull access Z, whereas the other array 15, 16 and 17 are arranged to generate their resultant forces anti-clockwise about the longitudinal hull access Z. FIG. 2 shows the individual forces and it will be noted that the levitation device 13 produces a vertical force Fa which acts clockwise about the longitudinal access Z, whereas the levitation device 16 exerts a force Fd acting counter-clockwise about the longitudinal access Z. The electromagnets 12 and 14 respectively produce clockwise forces Fb and Ff, whereas the electromagnets 15 and 17 produce respective counter-clockwise forces Fc and Fe.

FIG. 2 shows the resolution of the forces Fa, Fb, Fc, Fd, Fe and Ff into their vertical and horizontal components. From this it will be noted that the structure 11 and its associated machinery is supported by a vertical force Fz comprising the sum of the forces Fa+Fbz, +Fcz+Fd, +Fez+Ffz. As shown, the horizontal force Fbx cancels the horizontal force −Fcx and the horizontal force −Fex cancels the horizontal force −Ffx. This is a position of equilibrium and ensures the transverse position and orientation of the structure 11 within the hull 10. It will particularly be noted that this is achieved without any mechanical contact between any of the electromagnets 20 their respective armatures 22 and that there is no path for the transmission of noise from the structure 11 and its associated machinery M to the hull 10. This equilibrium position is achieved by the control device taught in our aforesaid co-pending British Patent Application No. 9604429.2 the control device being used to regulate the current to the electromagnet 20 of each levitation device 12, 13, 14, 15, 16, 17 such that the resultant vertical force Fz will balance the force necessary to maintain the structure 11 and its associated machinery M substantially in a predetermined vertical position within the hull 10. Similarly, the levitation devices produce a resultant horizontal force Fx which will normally be zero when the structure 11 and its associated machinery M is in a predetermined horizontal position within the hull 10 and the vessel is not turning.

Whenever the hull 10 is accelerated with either a vertical and/or horizontal component, the control device will vary the resultant forces Fz and Fx to maintain the structure 11 and its associated machinery M coaxial of the hull 10. The control device is also used to vary the forces produced by the levitation devices 12, 13, 14, 15, 16, 17 to produce a resultant torque T about the longitudinal axis Z. It will be seen that T=R (Fa+Fb+Ff−Fc−Fd−Fe). An unshown detection means is arranged to operate the control device dependant on the direction and rate of the rolling motion of hull 10, thereby controlling the torque T to counteract the inertia of the structure 11 and its associated machinery M. In this manner the flux gaps 24 are maintained substantially constant and the structure 11 and its machinery M follows the movement of the hull 10 without there being any mechanical connection between them.

Figure 3:
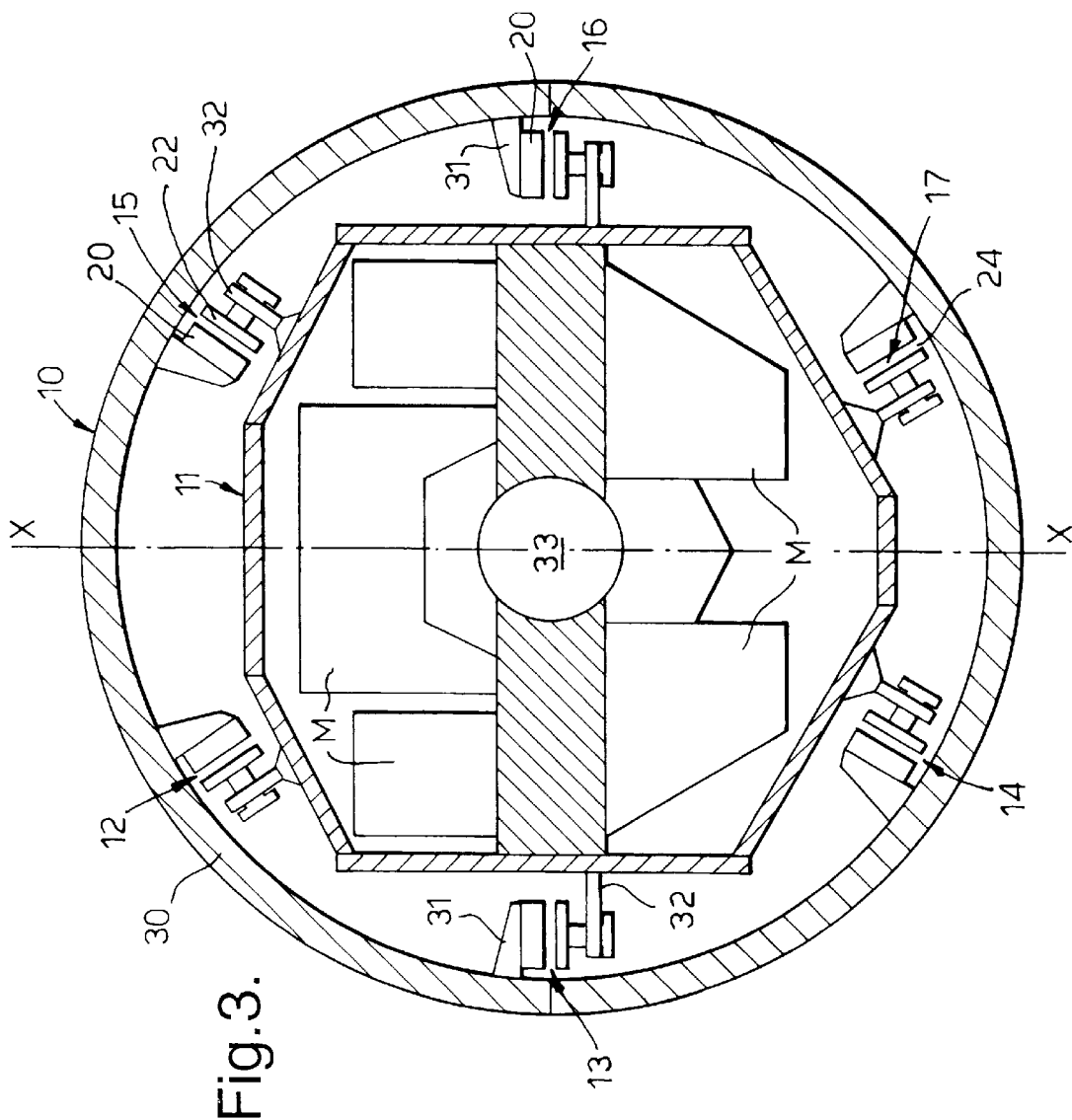
FIG. 3 is a diagrammatic transverse cross-section through a submarine hull illustrating the electromagnetic levitation devices and associated decoupling devices in greater detail.

With reference to FIG. 3, a submarine hull 10 comprises a series of plates 30 which are welded together to define a cylinder and support a series of internal stringers 31 providing rigid mountings for the electromagnets 20. The structure 11 is of generally octagonal section as shown and is provided with a series of brackets 32 which carry the armatures 22 through decoupling devices which will shortly be described in greater detail with respect to FIGS. 4 and 5. The structure 11 contains a selection of machinery M which typically could comprise the main propulsion plant, ancillary controls, and the primary drive shaft 33 to the propulsion propeller or other mechanical propulsion means. It will be appreciated that, during operation of the submarine, the application of torque to the primary drive shaft 33 will cause a corresponding torque reaction to the structure 11. This reaction is counteracted by the operation of the control device which maintains the flux gaps 24 constant, thereby producing a torque to balance the torque reaction of the drive shaft 33. It will be appreciated from FIG. 3 that the hull 10 is completely isolated from any vibration caused by the machinery M. Transmission of vibration by the primary drive shaft 33 would be prevented by an electromagnetic drive coupling, or similar device known in the art.

Although the control device taught in our aforesaid Patent Application operates extremely rapidly, the hull 10 can be subjected to intense shock loading, for instance caused by the explosion of external ordinance. If the shock loading is sufficiently high, the sudden movement of the hull 10 can close the corresponding flux gaps 24 to such an extent that the electromagnets 20 could impact their armatures 22 with consequent damage. This can be avoided by using decoupling devices of the kind taught in our co-pending British Patent Application No. 9604952.3 (GEC Case file P/60856/MRC) filed on Mar. 8, 1996, the whole contents of that application being incorporated herein by reference.

Figure 4:
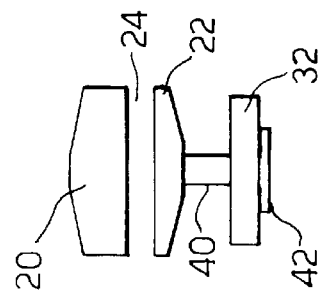
FIG. 4 is an enlarged elevation of one of the decoupling devices shown in FIG. 3.
Figure 5:
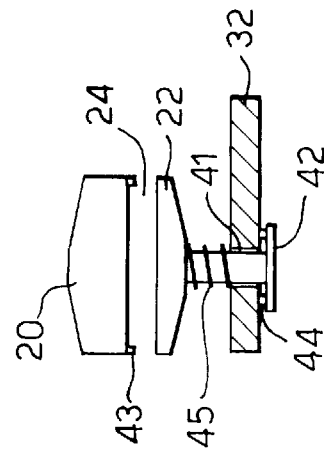
FIG. 5 shows a modification of the decoupling device illustrated in FIG. 4.

FIGS. 3, 4 and 5 indicate general details of such a decoupling device. In FIGS. 3 and 4 it will be noted that the armature 22 is mounted from its bracket 32 by a cylindrical pillar 40 which is a sliding fit in a corresponding aperture 51 in the bracket 32 and is retained by an enlarged head defining a stop 42. In this manner the levitational forces applied to the armature 22 are transmitted to the bracket 32 via the cylindrical pillar 40 and its enlarged head 42.

FIG. 5 differs from FIG. 4 insofar as compressible buffers 43 and 44 are interposed respectively between the faces of the electromagnet 20 and its armature 22, and between the enlarged head 42 and the bracket 32. These buffers could conveniently be made from a hard rubber. Also a compression spring 45 reacts between the bracket 32 and the underside of the armature 22. The compression springs 45 are designed to support the armatures 22 normally in an operative position relative to the supports 32.

Figure 6:
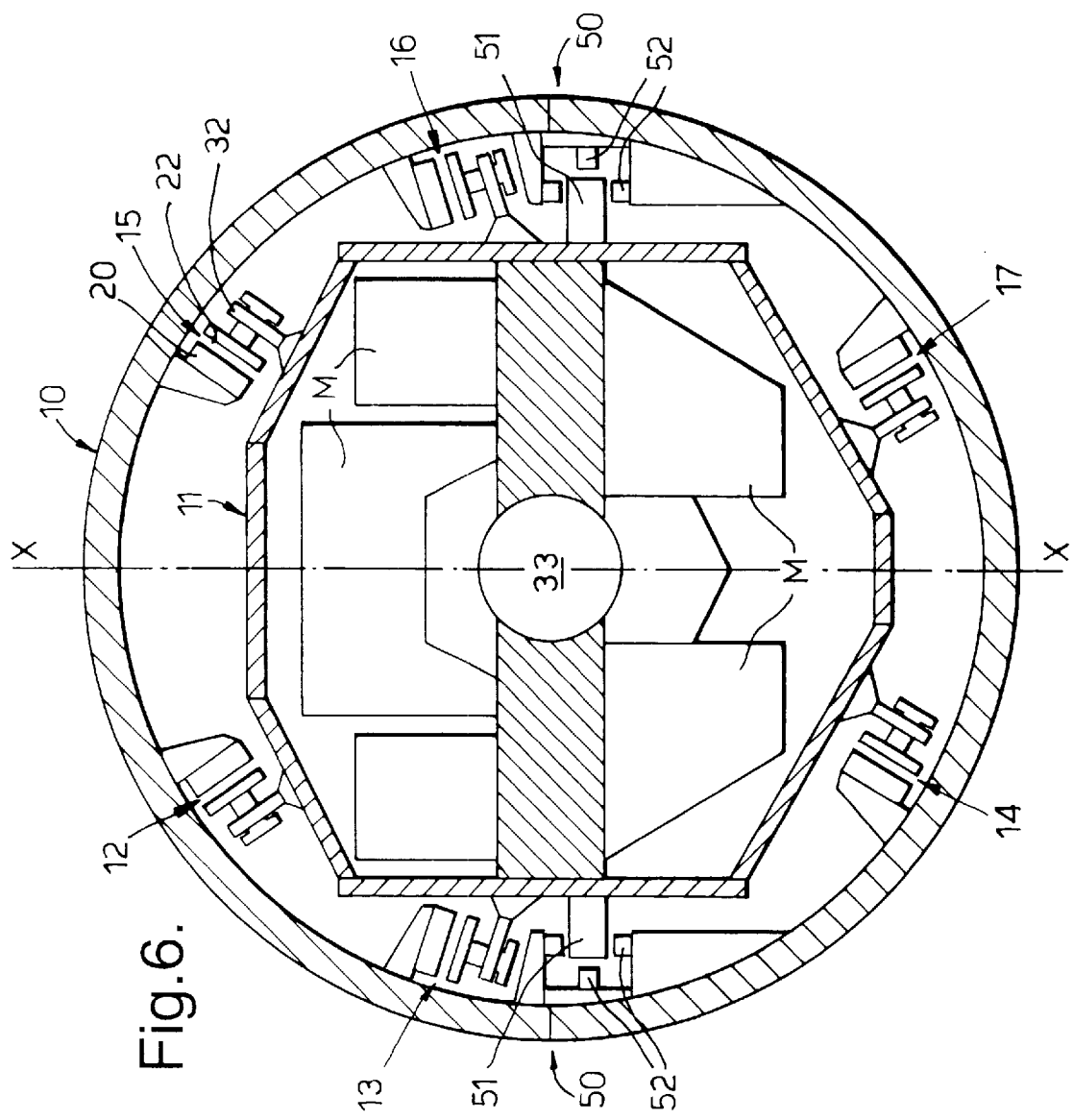
FIG. 6 is a diagrammatic transverse cross-section, similar to FIG. 3, but showing the reorganisation of the electromagnetic levitation devices to accommodate a shock absorber.

FIG. 6 is generally similar to FIG. 3 but illustrates how the levitation devices 13 and 16 can be repositioned to permit optimum positioning of shock absorbers 50 which are arranged one to each side of the structure 11. Each shock absorber 50 comprises a longitudinal flange 51 which is rigidly secured to the adjacent portion of the structure 11 and is equally spaced between three shock snubbers 52 as shown. Each flange 51 is mounted in a position in which it is normally equally spaced from each of its shock snubbers 52 and serves to limit the maximum movement of the structure 11 in any direction relative to the hull 10.

FIG. 7 is a longitudinal section through the hull 10 diagrammatically illustrating the relative position of the structure 11 and its associated machinery M, but omitting the levitation devices 12, 13, 14, 15, 16, and 17. Brackets 53 are secured within the hull 10 and can conveniently be formed by a hull frame. As shown, two pairs of electromagnets 54 and 55 are mounted at opposite sides of the bracket 53 and are arranged to attract respective armatures 56 and 57 which are mounted on the structure 11 by respective brackets 58 and 59. As shown, the armatures 56 and 57 can be connected to their respective brackets 58 and 59 by decouplers of the type already referred to with reference to FIGS. 4 and 5. In operation, the electromagnets 53 and 55 have their currents regulated by a controller to generate a resultant axial force between the hull 10 and the structure 11, this force being controlled to maintain the structure 11 and its associated machinery M substantially in the predetermined axial position shown in FIG. 7.

Figure 8:
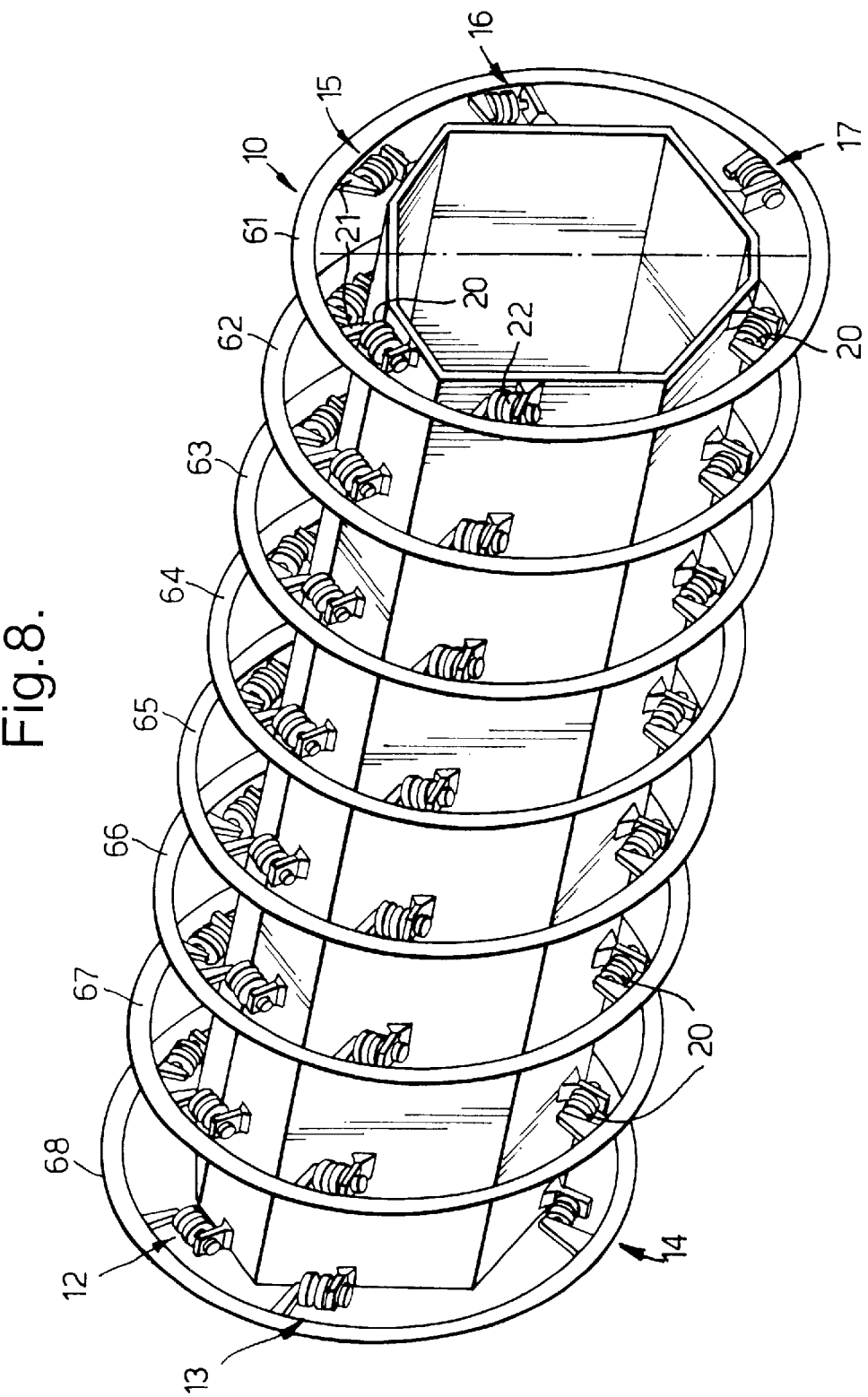
FIG. 8 is an isometric view of part of a submarine hull with the plating removed to show the arrangement of the electromagnetic levitation devices into groups spaced longitudinally of the hull.

FIG. 8 illustrates a hull portion 10 from which the plates have been removed to reveal ribs 60 which serve to support the brackets 21 of the electromagnets 20. It will be seen that the levitation devices 12, 13, 14, 15, 16 and 17 are still split into two arrays as already described with reference to FIGS. 1, 2, 3 and 6. However, it will be noted that the levitation devices are also split into a plurality of groups 61, 62, 63, 64, 65, 66, 67 and 68 which are equally spaced longitudinally of the hull and each comprises a first array of levitation devices 12, 13 and 14 and an opposed array of levitation devices 15, 16 and 17. In this manner the operation of the control device is able to distribute the electromagnetic forces differentially around and along the entire surface of the structure 11.

Figure 9:
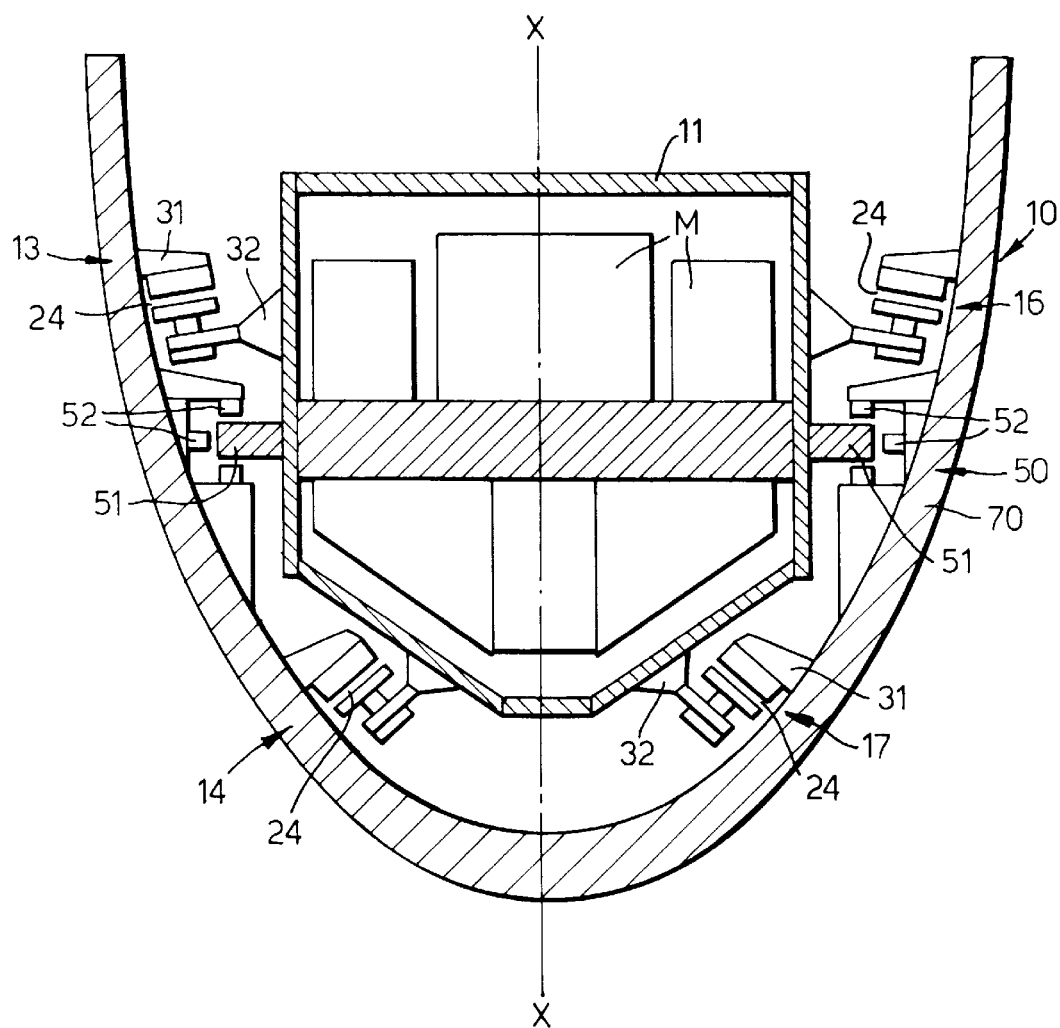
FIG. 9 is a diagrammatic transverse cross-section taken through the hull of the surface vessel, showing a preferred arrangement of electromagnetic levitation means together with associated shock absorber and decoupling devices.

FIG. 9 shows the application of the invention to a surface vessel having a displacement hull defined by a series of ribs 70. The same reference numerals are used to denote components already described with reference to the proceeding drawings. Such components have exactly the same function as already described, but it will be noted that the levitation devices 12 and 15 have been omitted, and that the flux gaps 24 of the levitation devices 13, 14 16 and 17 do not extend generally radially of the curvature of the adjacent hull. However, it will be seen that the flux gaps do extend generally normal to the adjacent hull radius, that is normal to the direction of potential hull distortion.

In addition to providing a vastly improved structure for a vessel, such as a submarine, the invention also enables a submarine to be manufactured in a unique manner which facilitates very considerable savings in constructional costs. In FIG. 10, a submarine is built from a plurality of hull portions including portions 70 and 71 which are shaped and dimensioned to be joined end to end along their respective cylindrical surfaces 72 and 73 which are arranged generally transverse to the longitudinal axis ZZ of the hull. The machinery M is mounted on the structure 11 whilst it is positioned outside the hull portions 70 and 71, thereby greatly facilitating access to the machinery and its interconnection such as indicated by references 74 and 75. The amount of machinery and associated surfaces to be supported by the structure 11 is extremely complex and its conventional assembly within the hull of the submarine is notoriously difficult and expensive. The structure 11 can be of any convenient configuration but is provided with the armatures 22 of the levitation devices 13 and 16. On the other hand, the electromagnets 20 of the levitation devices 13 and 16 are mounted within the hull portion 70 before the insertion of the structure 11 into its open end 76.

The structure 11 and its assembled machinery M, 74, 75 is conveniently slid into the hull portion 70 using any convenient means, for instance a set of rails which may either be left in position or subsequently removed. The flux gaps between the electromagnets 20 and armatures 22 are sufficient to allow axial insertion in this manner. However, the use of decoupling devices, such as those illustrated in FIGS. 4 and 5 enables the assembly clearances to be enlarged by deliberately depressing the armatures 22 against their springs 45 and holding them in the depressed position, for instance by using clips. In this manner the clearances between the electromagnets 20 and armatures 22 is increased during insertion of the structure 11 into the hull portion 70. After insertion of the structure 11 through the open end 76, the two hull portions 70 and 71 are moved together and their abutting surfaces 72 and 73 are welded together.

Although this is the preferred method of assembly, it would be possible to exchange the positions of the electromagnets 20 and armatures 22, or to defer fitting the electromagnets 20 and/or armatures 22 to their respective supports until after the structure 11 has been inserted into the hull portion 70.

What is claimed is:

1. A vessel comprising a hull containing a structure carrying machinery and an electromagnetic levitation means which is arranged to support the structure from the hull by electromagnetic forces between flux gaps that extend generally normal to a direction of potential hull distortion.

2. A vessel, as in claim 1, in which the hull is curved and the flux gaps extend generally radially of the adjacent hull curvature.

3. A vessel, as in claim 1, in which the hull is fully submersible and is generally cylindrical, and the flux gaps extend longitudinally of the hull and generally radially of the adjacent hull curvature.

4. A vessel, as in claim 1, in which the electromagnetic levitation means comprises a set of electromagnets separated by the flux gaps from a corresponding set of armatures, one set being secured to the hull and the other set being secured to the structure, and each electromagnet and associated armature are arranged to define a levitation device.

5. A vessel, as in claim 4, in which the levitation devices are split into two arrays disposed in a transverse plane normal to the longitudinal hull axis, one array being arranged to generate clockwise resultant forces about the longitudinal hull axis and the other array being arranged to generate anti-clockwise resultant forces about the longitudinal hull axis.

6. A vessel, as in claim 5, in which the levitation devices are additionally split into a plurality of groups spaced longitudinally of the hull and each comprising a pair of the arrays.

7. A vessel, as in claim 6, in which each levitation device is arranged such that its armature will be attracted by its electromagnet, and a control device is provided to regulate the current to the electromagnet of each levitation device such that the resultant of the forces generated by the levitation devices will balance the force necessary to maintain the structure and its associated machinery substantially in a predetermined position within the hull.

8. A vessel, as in claim 7, in which the control device is arranged to regulate the current to the levitation devices such that the resultant forces will also balance the forces necessary to maintain the structure and its associated machinery substantially in a predetermined orientation relative to the hull.

9. A vessel, as in claim 7, in which the control device is arranged to provide differential regulation of the levitation devices to produce a torque to counteract the inertia of the structure and its machinery during rolling motion of the hull.

10. A vessel, as in claim 7, including a detection means which is arranged to operate the control device dependant on the direction and rate of the hull motion.

11. A vessel, as in claim 6, in which the control device is arranged to provide differential regulation of the levitation devices to produce a couple to counteract the inertia of the structure and its machinery during hull motion.

12. A vessel, as in claim 6, in which the machinery is arranged to drive a mechanical propulsion means for the vessel, and the control device is arranged to provide differential regulation of the levitation devices to produce a torque to balance the torque reaction of the mechanical propulsion means on the support.

13. A vessel, as in claim 4, in which each levitation device incorporates a decoupling device to permit movement of the structure beyond the position defined by the closing of its flux gap.

14. A vessel, as in claim 1, including a shock absorber arranged to engage and support the structure directly from the hull whenever the resultant forces generated by the levitation means are unable to maintain the structure and its associated machinery in its predetermined position and/or orientation.

15. A vessel, as in claim 1, in which the structure is supported in a predetermined axial position within the hull by an electromagnetic device, and a controller is provided to regulate the current to the electromagnetic device to generate a resultant axial force equal to the force necessary to maintain the structure and its associated machinery substantially in the predetermined axial position.

16. A method of manufacturing a submarine, comprising building the hull in at least two portions which are shaped and dimensioned to be joined end-to-end along respective surfaces arranged generally transverse to the longitudinal axis of the hull, mounting machinery on a structure positioned outside the hull portions, inserting the structure with its mounted machinery longitudinally into an open end of one hull portion, and arranging an electromagnetic levitation means between the one hull portion and the structure with associated flux gaps extending longitudinally of the hull and generally radially of the adjacent curvature of the one hull portion, and joining the hull portions end-to-end after the insertion of the structure into the one hull portion.

17. A method, as in claim 16, comprising mounting one portion of the electromagnetic levitation means on the structure whilst it is positioned outside the hull portions.

18. A method, as in claim 17, comprising mounting the remainder of the electromagnetic levitation means within the one hull portion before the insertion of the structure.

19. A method, as in claim 16, including constructing the electromagnetic levitation means as a set of electromagnets separated by the flux gaps from a corresponding set of armatures whereby each electromagnet and its associated armature define a levitation device, and building each levitation device with a decoupling device to permit relative movement between its electromagnet and its armature beyond the position defined by its flux gap, and using the decoupling devices to increase the clearances between the electromagnets and the armatures during insertion of the structure into the said one hull portion.

20. A submarine manufactured by the method of claim 16.

* * * * *